Dec. 15, 1931.  F. G. CARNAHAN  1,836,902
PUNCTURE SELF SEALING INNER TUBE
Filed Feb. 5, 1931  3 Sheets-Sheet 1
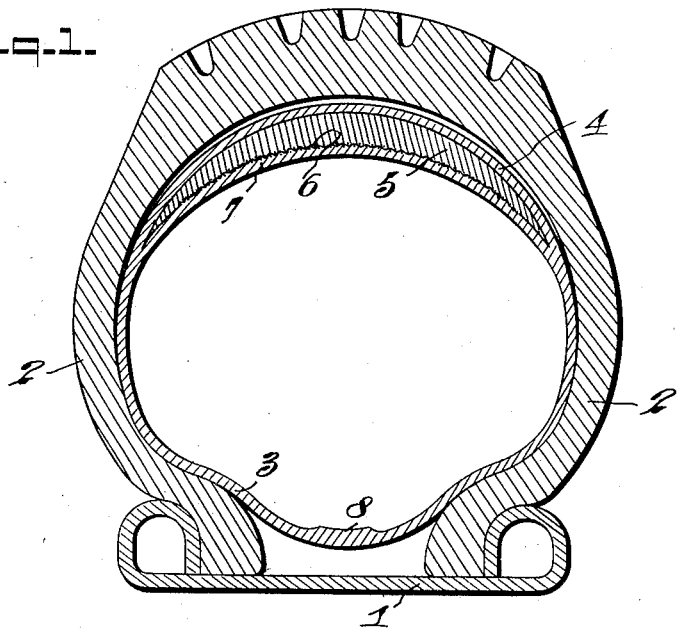
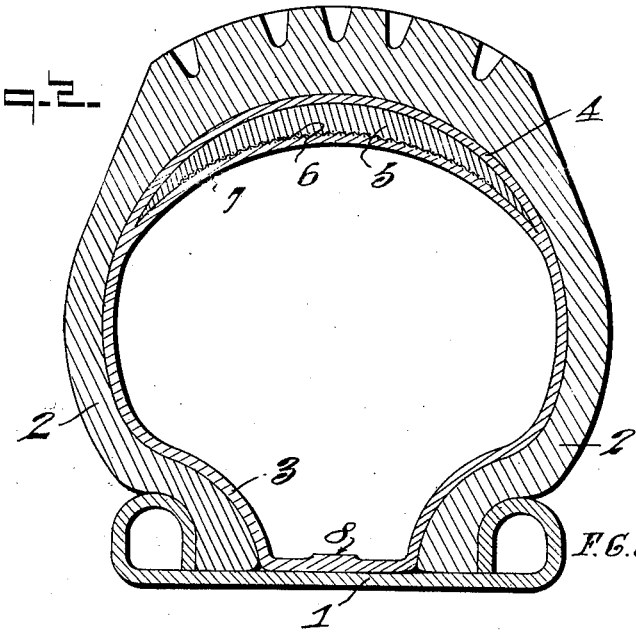
Inventor
F. G. Carnahan.

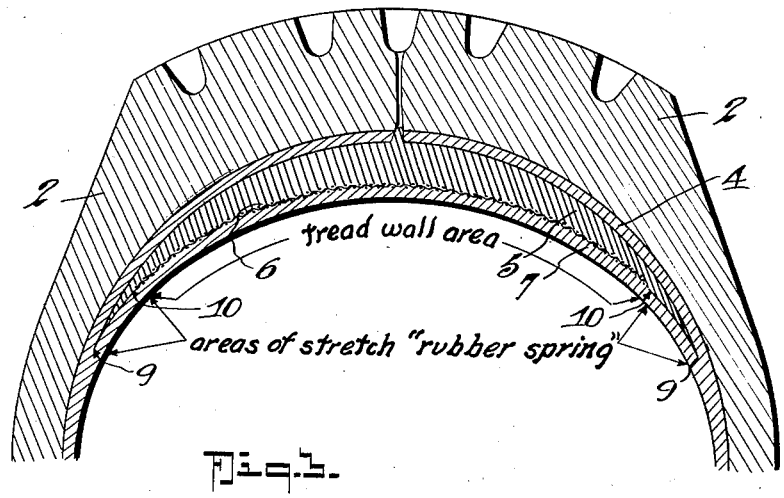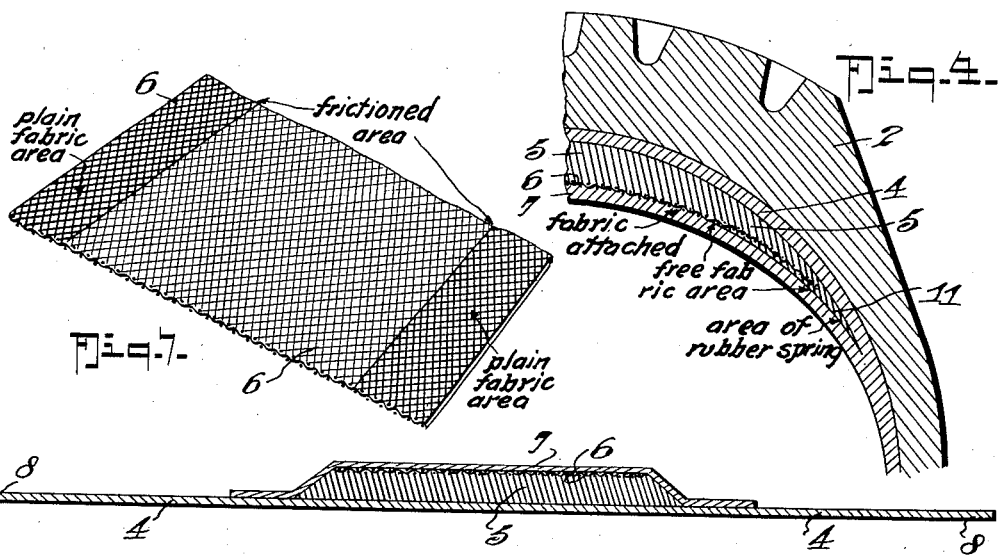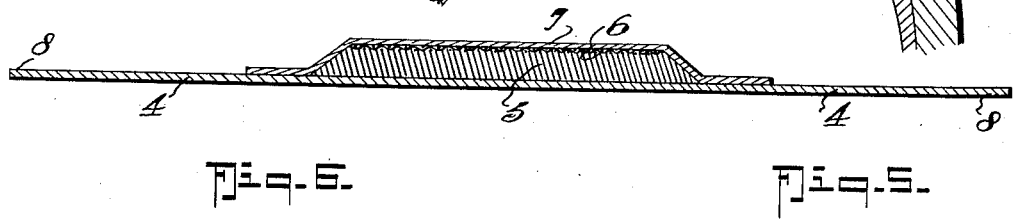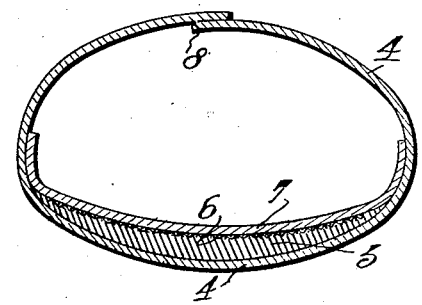

Dec. 15, 1931.   F. G. CARNAHAN   1,836,902
PUNCTURE SELF SEALING INNER TUBE
Filed Feb. 5, 1931   3 Sheets-Sheet 3
Fig. 8.
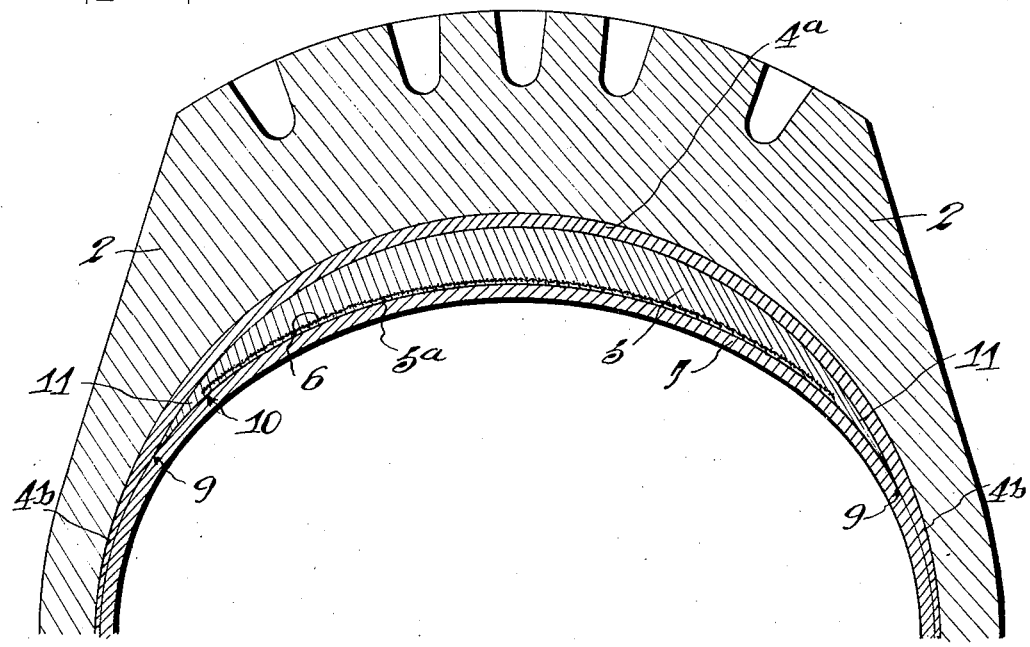
Fig. 9.
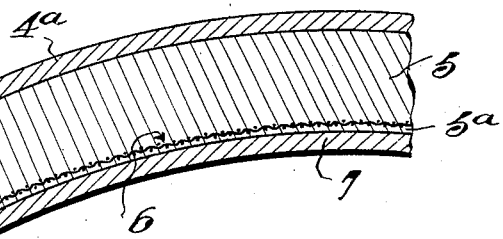
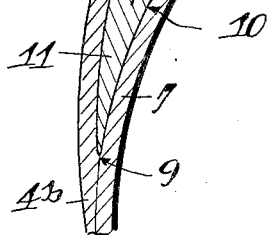
INVENTOR
F. G. Carnahan.
BY
Albert E. Dietrich
ATTORNEY Patented Dec. 15, 1931

1,836,902

UNITED STATES PATENT OFFICE

FRANK G. CARNAHAN, OF AKRON, OHIO, ASSIGNOR, BY MESNE ASSIGNMENTS, TO THE A-R PRODUCTS CORPORATION, OF AKRON, OHIO, A CORPORATION OF OHIO

PUNCTURE SELF-SEALING INNER TUBE

Application filed February 5, 1931. Serial No. 513,756.

My invention relates to certain new and useful improvements in inner tubes used in the inflation of tire casings or shoes. It particularly has for its object to provide a tube of such construction as will be of long life, due to the elimination of all danger of breaking down or tearing the side walls of the tube particularly at the places where greatest flexing occurs during the action of the tire and tube.

Heretofore, it has been the practice, where fabric strips were used in the compression type of puncture sealing tubes to employ a closely woven fabric for protecting the inner tube and permanently unite the side edges of the fabric to the side walls of the tube along peripherial lines (see Letters Patent to Brown No. 956,884, issued May 3, 1910, for example). This construction, when the tire is in use, causes strains to be placed on the side wall sectors of the tube at the very places where the greatest bending or stretching takes place, and furthermore results in placing the stretching strains practically entirely on the side walls and lower part of the tube.

In puncture sealing inner tubes using plastic substances where no fabric is employed (see the patent to Crombie No. 1,498,017, issued June 17, 1924, for example) there is nothing to hold the filler from bunching while the tube is in use.

It has recently been proposed to make a self-sealing tube in which a plastic substance is located on the inside of the tube and is covered by a close mesh fabric strip held to float in pockets formed in the sides of the tube so as to be free to move in all directions within predetermined limits, the pockets being formed by separate strips of rubber vulcanized to the side walls of the tube and overlapping the sides of the fabric strip but not vulcanized thereto (see Letters Patent to Kline No. 1,774,892, issued September 2, 1930, for example).

Difficulty, however, has been experienced in manufacturing the Kline tube because of the plasticity of the sealing compound and the difficulty of properly placing the fabric and the pocket strips in position with respect to each other and to the tube rubber and holding them so while the strips are vulcanized to the tube. Further, since the pockets are open ones, in the embodiment illustrated in the Kline patent, the plastic substance tends to ooze out of the pockets into the chamber of the tire which is, of course, objectionable because it prevents the use of a plastic compound which will harden or set on exposure to the air and it also permits the oozing plastic to stick the tube together when the tube is collapsed. Furthermore, if the fabric be left to move in all directions free from restraint other than that caused by its contact with the plastic filler, the centrifugal force, as the tire is running, (and this is especially true of truck tires) will cause the mass of plastic filler and the fabric to bunch up at the peripheral center of the tube and thus reduce the puncture curing properties of the tube toward the sides of the tread considerably.

In order to overcome the deficiencies above noted I have found that by forming the tube with a closed pocket or chamber in its tread wall sector and employing a vulcanizable rubber-friction fabric in lieu of the plain fabric of the Kline patent, placing the fabric against the inner wall-layer of the chamber of the tread sector of the tube, it may be vulcanized to such innermost wall layer and will thus be held against creeping in any direction, the fabric being of less width in cross section of the tube than that of the chamber, terminates short of the bottoms of the chamber at the sides of the tube and thereby leaves a thickness of plastic filler extended at each side of the fabric strip to cooperate with the rubber of the tube, there, in taking up the flexing and bending strains encountered while the tube is in use. The fabric need not be rubber-frictioned throughout its full width but for a greater or lesser distance from the side edges it may be left plain so that the side edges will float in the side pocket-like extremities of the chamber that is located in the tread wall of the tube and thereby retain all the principal advantages of the Kline construction while curing its deficiencies.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings in which:—

Figure 1 is a cross section of a tire with my improved tube in place before inflation.

Figure 2 is a view similar to Figure 1 after inflation.

Figure 3 is a similar view showing the action of the sealing compound to close puncture from which the puncturing article has been withdrawn.

Figure 4 is an enlarged detail cross section showing a modification of the invention in which the fabric is not friction over its entire surface, a portion of the fabric at the sides being left free to float.

Figures 5 and 6 are views showing a method of manufacturing the tube.

Figure 7 is a detail sectional perspective view of a portion of the fabric strip shown in Figure 4.

Figure 8 is a detail cross section showing a further modification of the invention.

Figure 9 is an enlarged detail cross section of the tube shown in Figure 8, the side edges of the fabric being spaced slightly farther from the rubber inner wall of the tube than in Figure 8.

In the drawings, in which like numerals of reference indicate like parts in all of the figures, 1 is a rim on which the tire shoe 2 is mounted, the rim and shoe being of any ordinary construction, the shoe being adapted to receive the inner tube 3 which comprises my invention. The inner tube 3 is preferably manufactured on a flat drum by placing over the drum a layer of tube stock 4, and over the tread sector thereof is placed the normally non-vulcanizable plastic compound 5. This composition is spread in place in such manner that the central portion thereof is the thickest and preferably tapers down toward the sides. Over the compound 5 as thus laid on the tube stock 4 is placed a strip of fabric 6 (preferably friction fabric) of less width, however, than that of the plastic compound 5 and over the fabric strip 6 and the exposed portions of the compound 5 at the sides thereof is placed a second layer of tube stock 7, the latter being of any suitable thickness and being of greater width than that of the compound 5 overlies the tube stock 4 and lies in contact with the same. The side edges 8 of the tube stock layer 4 are then brought together and overlapped (see Figure 6) in such a way as to locate the tire layer 4 to the outside of the tube—i. e. locate the plastic compound 5 and the tube stock 7 inside—and the parts are then subjected to vulcanization.

The fabric, it should be stated, is of the rubber friction kind (fabric with friction rubber coating on one or both faces) so that it will become vulcanized to the strip 7 as an integral structure.

As the strips 4 and 7, where they contact, become united into an integral structure on vulcanization, there is thereby provided an air-tight chamber in the tread sector of the tube which is filled with a layer of fabric lying directly against and secured to the bottom of the chamber and a more or less fluent plastic compound fills the remainder of the chamber and serves, when the rubber layers 7 and 4 are punctured, to flow into the apertures and plug the same. The plastic compound being of a sticky nature tends to adhere to the nail or other puncture producing article and as that article is pulled out (or as it works its way through the tube into the air chamber as sometimes happens) it will pull some of the compound with it into the puncture in the rubber wall of the tube through which it makes its exit and thus plugs the opening. While the puncture producing article is passing through the tube the close adhesion of the plastic substance thereto maintains the passage air-tight.

By vulcanizing the fabric 6 to the rubber layer 7 and having that layer, at its sides, vulcanized to the layer 5 below the side edges of the fabric, that portion of the tube between the points 9 and 10 (see Figure 3) acts as a spring and gives as the portion of the tube between the points 10—10 is forced outwardly by the air pressure. The fabric being vulcanized to the inner rubber wall layer effects a more uniform or even distribution of the pressures caused by the inflation of the tube and thereby gives a more uniform thickness to the plastic compound throughout than is possible with the Kline construction where the fabric is a free or floating one.

Tendency of the filler to bunch at the central peripheral part of the tube while the tire is running (due to centrifugal force acting on the more or less fluent filler) is counteracted by the surface adhesion of the compound to the fabric and to the outer wall of the tube and to both the inner and outer walls at the side extremities of the chamber, and by the spring action of the tube areas 9—10 at the sides of the tread sector.

In order to keep the side walls of the tube adjacent the filler chamber from being too stiff—i. e. in order to increase flexibility at the places where the greatest flexing and stretching action takes place while the tire is in use, the friction of the rubber of the fabric may be omitted for a greater or lesser distance from the edges of the fabric strip (see Figure 7) and these edges left free to float in the "pockets" 11 formed by the junctures of the strips 4 and 7, thus lengthening the spring sections 9—10 while still permitting the fabric 6 to act as an anchor throughout its entire area for the plastic filler and prevent it from being displaced from the pockets 11 by centrifugal force.

While in the Kline tube only a comparatively thin layer of the plastic filler is used, with my construction it is possible to increase the thickness of the plastic layer considerably, tapering the thickness down toward the sides of the layer to provide a comparatively thin layer in the pockets 11 and in this way give the utmost puncture protection where the liklihood of punctures to occur is greatest.

From the foregoing it will be seen that by providing a closed chamber for the plastic substance and the fabric strip, the plastic substance cannot ooze into the central air chamber and thus I am enabled to use a plastic substance which, upon contact with the air, hardens by oxidation and becomes a permanent plug for the puncture in the tube stock. If such a compound is used in the Kline tire it will soon deteriorate and become hardened because of the communication with the interior air chamber at the side pockets.

It must be further understood that more or less heat is generated in the running of a tire which tends to increase the fluency of the plastic compound and makes it necessary to provide a positive means for anchoring that compound against bunching up under centrifugal force. My construction, as has been demonstrated in actual practice, accomplishes this desirable result.

Since the plastic compound 5 is non-vulcanizable during the process of vulcanizing the tube stock layers and the fabric together, it at all times remains free from the fabric and the tube stock save for such adhesion as is due to the sticky nature of the compound itself. Therefore it may readily adapt itself to variations in the relative positions of the layers 4 and 7 during the movements of the tube when the tire is running and tend to maintain at all times a uniform given thickness.

The spring provided in the tube sectors 9—10 minimizes and absorbs the shock and strain of the fabric caused by the motion of the fabric on the walls of the tube and thus prevents such strain from breaking the tube.

Another advantage of the present construction is that it is not necessary to employ such a close weave fabric as that required by the Kline tube since the fabric does not have to serve as a hold-back shield for the plastic substance. By using a somewhat coarser fabric the plastic substance will interlock as it were with the interstices of the fabric and in this way aid in reducing surge of the plastic compound due to the movements of the tire and tube.

It has been found that in some cases a sufficient adhesion of the fabric strip 6 to the rubber wall 7 of the tube can be obtained without vulcanizing the fabric directly to the rubber wall. For instance one may take an ordinary inner tube already vulcanized, or one semi-cured, and spread over its periphery a thin film (about one thirty-second of an inch or less thick) of the compound 5 as indicated at $5^a$ in Figures 8 and 9, lay the fabric strip 6 over this thin film or layer of compound, and then spread the remainder of the compound 5 over the strip 6 and finally place an outer layer of rubber $4^a$ over the whole, let the said outer layer of rubber lap beyond the sides of the compound 5 over the tube 7 as at $4^b$ and then vulcanize the rubber together. While in this construction the fabric 6 cannot be said to be vulcanized to the rubber walls 7 as in the preceding embodiment of the invention, the fact that only a very thin layer of compound is interposed between the fabric 6 and the rubber 7, which compound posseses strong adhesive properties, the fabric is thereby cemented to the inner wall 7, as it were, by a very slightly yieldable film of compound. This cementation may be sufficiently strong to hold the fabric in place and prevent its creeping and bunching without the necessity of vulcanizing the fabric directly to the rubber wall 7. While the fabric 6 used in this construction may be frictioned fabric, still fabric that is not frictioned may be used especially after giving it a coat of rubber cement.

This application is a continuation in part of my application filed September 18, 1930, Serial No. 482,846, allowed December 23, 1930.

Other advantages of my invention will be clear to those skilled in the art and it is thought that from the foregoing description, taken in connection with the accompanying drawings, the construction, operation and advantages of the invention will be clear to those skilled in the art to which it appertains.

What I claim is:

1. An inner tube enclosing an air chamber and including another chamber in the tread wall sector extending from one side wall sector of the tube to the other across and around the tube, a layer of rubber friction fabric located within said another chamber in contact with the inner rubber wall of the tread sector of the tube, and a filler of normally non-vulcanizable self-sealing compound located in said another chamber, the said compound overlying the side edges of said fabric, the fabric being vulcanized to said inner rubber wall and said sealing compound remaining unvulcanized, substantially as and for the purpose described.

2. An inner tube comprising a body enclosing an air chamber, said body including a tread wall area, side wall areas and a bottom area, a self-sealing compound located in contact with and substantially co-extensive with the inner surface of the tread wall area, a friction fabric located on the surface of said sealing compound which is not in contact with said tread wall area of the body, the width of said fabric in cross section being less than the width of said sealing compound, and a rubber layer covering said fabric and the surfaces of the compound at the sides of said fabric and overlying at least a portion of the side wall areas of the body, said fabric and said last named rubber layer being vulcanized together and said last named rubber layer being vulcanized to said body substantially as shown and described.

3. An inner tube enclosing an air chamber and including another chamber in the tread wall sector extending from one side wall sector of the tube to the other across and around the tube, a layer of rubber friction fabric located within said another chamber in contact with the inner rubber wall of the tread sector of the tube, and a filler of normally non-vulcanizable self-sealing compound located in said another chamber, the said compound overlying the side edges of said fabric, the fabric being vulcanized to said inner rubber wall and said sealing compound remaining unvulcanized, said fabric including side edge portions free of friction rubber for the purposes specified.

4. An inner tube enclosing an air chamber and including another chamber in the tread wall sector extending from one side wall sector of the tube to the other across and around the tube, a layer of suitable fabric located within said another chamber in contact with the inner rubber wall of the tread sector of the tube, and a filler of normally non-vulcanizable self-sealing compound located in said another chamber, the said compound overlying the side edges of said fabric, the fabric being vulcanized to said inner rubber wall and said sealing compound remaining unvulcanized, substantially as and for the purpose described.

5. An inner tube comprising a body enclosing an air chamber, said body including a tread wall area, side wall areas and a bottom area, a self-sealing compound located in contact with and substantially co-extensive with the inner surface of the tread wall area, a suitable fabric located on the surface of said sealing compound which is not in contact with said tread wall area of the body, the width of said fabric in cross section being less than the width of said sealing compound, and a rubber layer covering said fabric and the surfaces of the compound at the sides of said fabric and overlying at least a portion of the side wall areas of the body, said fabric and said last named rubber layer being vulcanized together and said last named rubber layer being vulcanized to said body substantially as shown and described.

6. An inner tube enclosing an air chamber and including another chamber in the tread wall sector extending from one side wall sector of the tube to the other across and around the tube, a layer of suitable fabric located within said another chamber in contact with the inner rubber wall of the tread sector of the tube, and a filler of normally non-vulcanizable self-sealing compound located in said another chamber, the said compound overlying the side edges of said fabric, the fabric being vulcanized to said inner rubber wall and said sealing compound remaining unvulcanized, said fabric including side edge portions free of vulcanizable rubber for the purposes specified.

7. An inner tube of vulcanized rubber enclosing an air chamber, said tube having another chamber in the tread wall sector which extends from one side wall sector of the tube to the other across and around the tube, a layer of fabric located within said another chamber in close proximity to the inner rubber wall of the tread sector of the tube and extending from one side wall to the other side wall, and a filler of normally non-vulcanizable self-sealing compound located in said chamber and overlying the edges of said fabric and being of a sticky nature so as to adhere to said fabric and to the rubber of the tube with which it contacts.

8. An inner tube of vulcanized rubber enclosing an air chamber, said tube having another chamber in the tread wall sector which extends from one side wall sector of the tube to the other across and around the tube, a layer of suitable fabric located within said another chamber in close proximity to the inner wall of the tread sector of the tube and extending in a continuous unbroken width from one side wall to the other side wall, and a filler of normally non-vulcanizable self-sealing compound located in said chamber and embedding the edges of said fabric, there being a thin layer of filler located between the fabric and the inner rubber wall of the tube as a cementing means for securing the fabric against creeping with respect to said inner rubber wall of the tube.

FRANK G. CARNAHAN.